Dec. 27, 1966 J. A. DINSMORE ET AL 3,294,304
MAGNETIC TAPE TRANSPORT AND TRANSDUCING APPARATUS
Filed June 11, 1965 2 Sheets-Sheet 1

JOSEPH A. DINSMORE &
RICHARD I. SEDDON
INVENTORS

BY Robert S. Clay

ATTORNEY

MAGNETIC TAPE TRANSPORT AND TRANSDUCING APPARATUS

Filed June 11, 1965 2 Sheets-Sheet 2

JOSEPH A. DINSMORE and
RICHARD I. SEDDON
INVENTORS

BY Robert G. Clay

ATTORNEY 3,294,304
Patented Dec. 27, 1966

3,294,304

MAGNETIC TAPE TRANSPORT AND TRANSDUCING APPARATUS

Joseph A. Dinsmore, San Carlos, and Richard I. Seddon, Santa Rosa, Calif., assignors to Ampex Corporation, Redwood City, Calif., a corporation of California Filed June 11, 1965, Ser. No. 463,117
5 Claims. (Cl. 226—95)

This invention relates to magnetic tape transports, and particularly to improvements in the tape driving and transducing components thereof.

Previously the art has included magnetic tape transports of a type in which the tape is driven by a large-diameter capstan provided with a resilient (e.g., rubber or synthetic elastic material) surface portion engaging the tape. Frictional driving engagement between the tape and capstan is provided either by means of pinch rollers, or by tensioning the tape and causing the tape to have a large angle of wrap around the capstan. Some "zero-loop" arrangements of the above described type are known in which the transducing heads directly engage the tape on the capstan. In such arrangements, the pressure of the heads increases the frictional engagement of tape and capstan during record and playback modes at normal speed, but it is considered advisable to retract the heads when the tape is to be driven in fast wind modes, to reduce wear and abrasion of both the tape and the heads. A further classification of such transports may be made as to the relation of the tape and capstan during fast movement of the tape. In some such transports the tape is moved at fast speeds entirely by the reel motors; the pinch rollers, if any, are retracted, and the tape is caused to float frictionlessly on the capstan by means of an air bearing effect that occurs at high speed but not at normal speeds. In other such transports, the tape is moved at high speeds entirely by the capstan, and the reels are servoed to feed and take up the tape at a rate equal to and dependent on the tape speed imparted by the capstan. In such arrangements, if pinch rollers are not used and if the heads are to be retracted during high speed movement, the reel servo mechanism must also cause the reels to maintain sufficent tension in the tape to hold the tape in frictional driving engagement on the capstan. However, a difficulty arises in that the high-speed air bearing effect, previously referred to, tends to destroy the required frictional engagement, at least within the range of permissible tensions for the tape.

It has been proposed to deflate the air bearing by providing circumferential grooves on the tape-engaging surface of the capstan. Annular grooves are the most difficult to provide, and they have two other disadvantages. First, they must be located entirely between the recording tracks of the tape, because otherwise the head-to-tape pressures at the various heads in the head stack would be degraded, and unevenly so, during normal reproduce and record operations, with a consequent uneven degradation of the recorded and reproduced signals. However, to precisely match the capstan grooves with the between-track intervals of the head stack, poses fabrication and assembly problems that are difficult and expensive to solve. Second, even if the grooves could be so located, the head would soon become irregularly worn in such a manner that field replacement of the capstan would be virtually impossible, since the annular grooves of the new capstan would have to precisely match the raised portions of the head that were left by the grooves of the old capstan.

Accordingly, it is an object of the present invention to provide means for deflating a high-speed air bearing between a tape and capstan, while producing even wear and constant head-to-tape pressure forces between the tape and a transducing head stack during normal low-speed record-reproduce operation.

A structure in accordance with the invention includes a capstan with a helical groove formed in the tape-engaging surface thereof for deflating the air bearing that would otherwise occur at high speeds. The helical shape of the groove provides even wear of the tape and of the transducing head engaging the tape, recording and reproducing operation. In addition, the pitch of the helical groove is established as an aliquot part of the transverse width dimension of the magnetic pole tips of the head engaging the tape. Thus during recording and reproducing operation, the pressure bearing area between the pole tips and the tape remains constant, as the groove scans the pole tip, and the recorded and reproduced signal strength likewise remains constant.

A better understanding of the invention may be had by reference to the following description, taken in conjunction with the accompanying drawings, in which.

Figure 1:
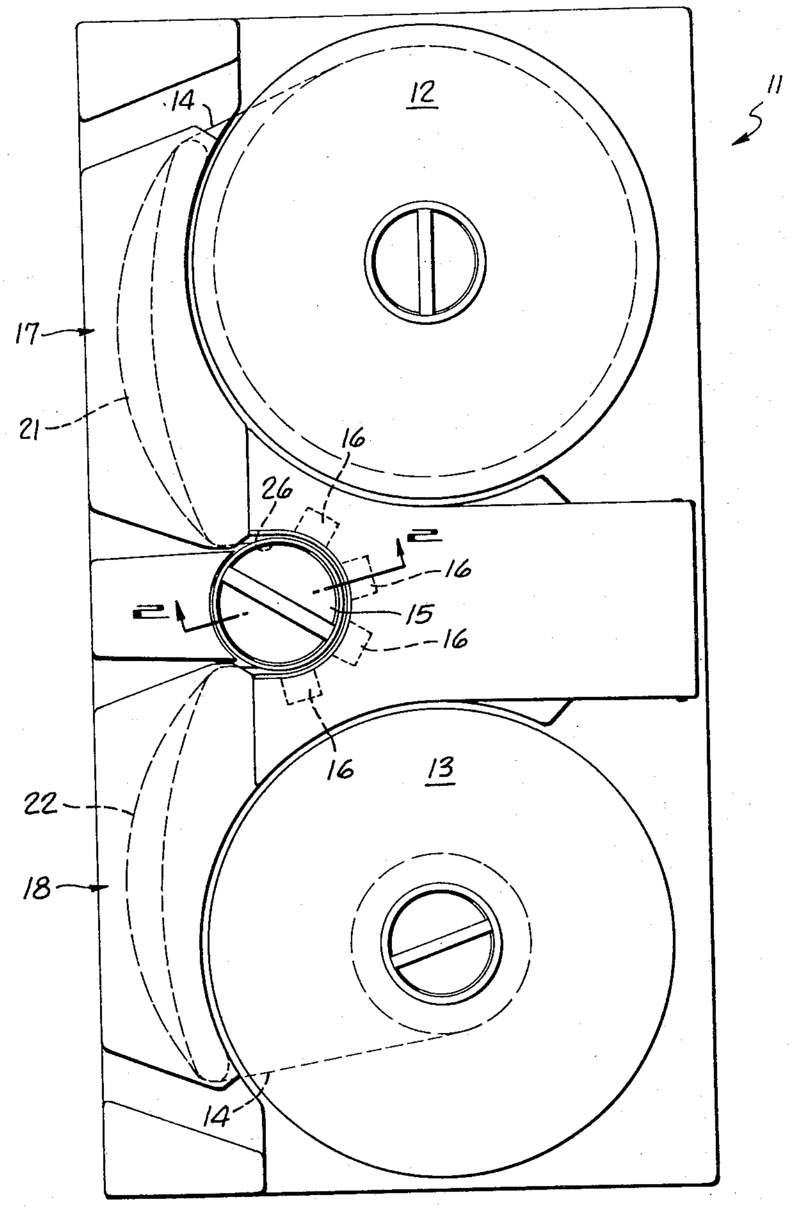
FIGURE 1 is an elevation of a tape transport including the apparatus of the invention.

Referring now to FIGURE 1 there is shown a magnetic tape transport 11 of the type disclosed in copending U.S. patent application S.N. 390,667 for "Tape Guide and Storage Device," by Jack K. Willis, filed August 19, 1964, assigned to the assignee of the present invention. Briefly, such a transport has a pair of reels 12, 13 for feeding and taking up a tape 14 that is driven by a capstan 15. A number of magnetic transducing head stacks 16 are arranged to engage the tape opposite the capstan during normal speed record and reproduce operation in either direction of tape motion. The head stacks 16 may be mounted as disclosed in U.S. patent application S.N. 245,570 for "Transducing Apparatus," by Jack K. Willis, filed Dec. 18, 1962, now U.S. Patent No. 3,227,816 and assigned to the assignee of the present invention. In such a mounting, the head stacks 16 are arranged for spring-loaded pressurized engagement with the tape on the capstan during record and reproduce operation, and for retraction completely free of the tape and capstan during high-speed operation as in fast forward and rewind, so as to minimize the wear of head and tape.

In a tape transport of the type shown in FIGURE 1 and disclosed in the above-referenced patent application S.N. 390,667, the entire control of the movement of the tape is performed by the capstan 15, and the reels 12, 13 and servoed to take up and supply the tape at a rate that is equal to and dependent on the speed of tape movement that is imparted by the capstan. Tape sensing and buffer storage means 17 and 18 are provided, in which the tape between the capstan and reels is stored in a pair of variable length segments 21, 22, which are tensioned by means of differential pressure devices, not shown, but disclosed in the above-referenced patent application S.N. 390,667. A photoelectric sensing device, also not shown, continuously senses the amount of tape in the loops 21, 22 and controls the movement of the reels 12, 13 so as to maintain a constant amount of tape in each of the loops as the tape is moved by the capstan 15.

It is to be understood that the necessary frictional driving engagement of the tape and capstan must be supplied entirely by the arrangement shown, in which the tape has a large angle of wrap on the capstan, so as to provide a large surface area for the friction to work in, the capstan having for example a rubber peripheral tape engaging portion 26 partly for increasing the coefficient of friction, and the normal force necessary for friction being provided by the tension of the tape as induced by the differential pressure mechanism 17, 18 in cooperation with the reel driving and braking mechanisms 12, 13. This form of frictional engagement is used in preference to pinch rollers or other positive pressure devices known in the art, because of the complication of the latter, and the perturbations introduced thereby. Furthermore, although the head stacks 16 do provide some slight normal force to the tape and capstan during normal speed record and reproduce operation, the heads 16 are retracted as above mentioned during high-speed winding operations.

Within the framework of the above conditions, a problem appears during the described high-speed winding operation, in that there is a tendency for an air bearing to be established between the tape and capstan, in a well-known manner, with the result that the tape tends to float in spaced relation to the capstan supported on a cushion of pressurized air and out of frictional contact with the capstan. In transports of the type in which the tape is moved for fast wind by the reels alone, independently of the capstan, such an air bearing would be an advantage. However, in the type of transport herein described, if an air bearing is established, the tape comes to a stop because, as previously described, the sole driving force for the tape is provided by the capstan, and the reels 12, 13 are servoed merely to take up the tape at a rate dependent on the speed imparted to it by the capstan. Consequently it is of great importance to provide means for deflating incipient air bearings in the fast forward and rewind operation of the capstan.

Figure 3:
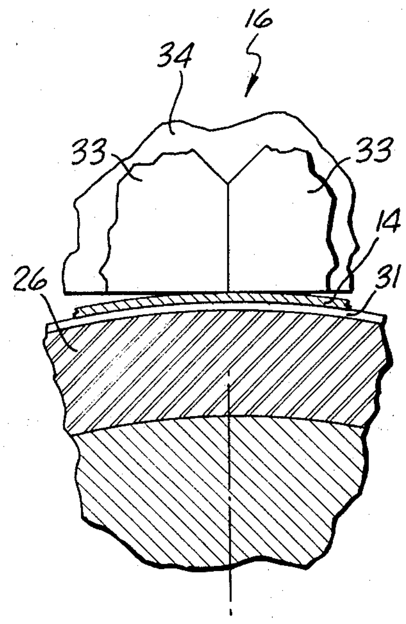
FIGURE 3 is a section taken on the plane of lines 3—3 of FIGURE 2.
Figure 2:
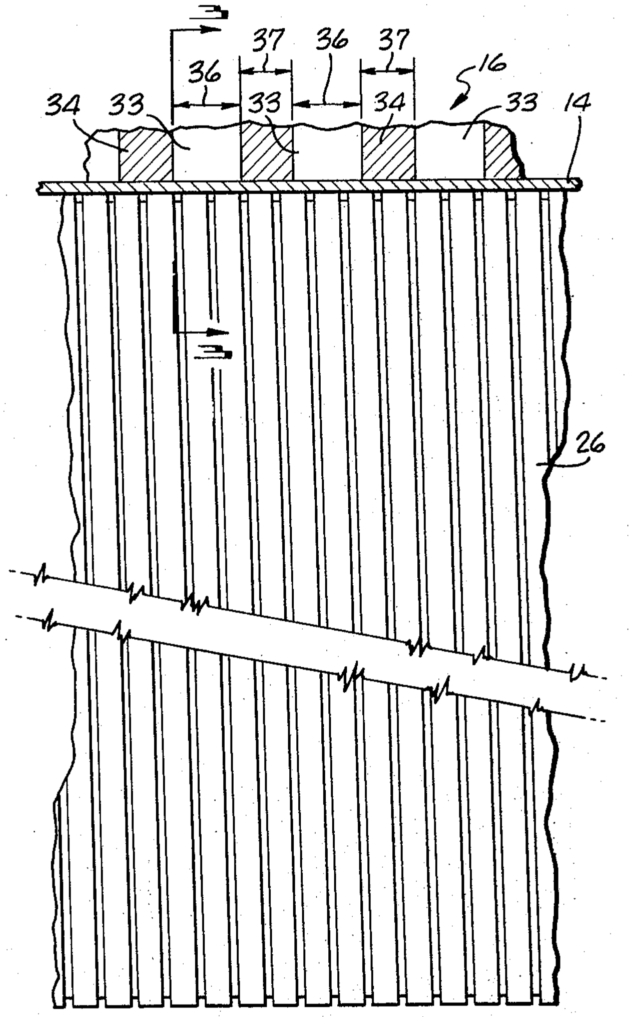
FIGURE 2 is a section, taken at an enlarged scale, on the plane of lines 2—2 of FIGURE 1.

Accordingly, as shown in FIGURES 2 and 3, the rubber tape engaging portion 26 of the capstan is provided with a helical groove 31, the axis of which is coextensive with the axis of the capstan, so that air that is trapped between the converging confronting surfaces of the tape and capstan at the upstream side thereof, escapes laterally into the various turns of the groove 31 and does not form a pressurized cushion between the tape and the portions of the capstan surface between the turns of the groove. The term "upstream" is used herein to designate the side of the capstan from which the tape approaches the capstan, in each of the two possible directions of tape motion.

Thus it will be seen that the groove 31 acts to deflate incipient air bearings during fast forward and reverse driving of the tape when the head stacks 16 are retracted. Furthermore, as particularly shown in FIGURES 2 and 3, when the head stacks 16 are in position to engage the tape as during normal speed record and reproduce movement of the tape in either direction, the various turns of the groove 31, and the land portions 32 between the turns of the groove, regularly traverse or scan the tape and head stack in an axial direction of the capstan so as to provide uniform average pressure and uniform wear.

A particular feature of the present invention lies in the dimensional relationship of the groove 31 with respect to the various pole tips 33 of the head stack. Each head stack 16 has a number of separate transducing heads, each including a pair of such pole tips 33, mounted by means of a moulding process as an integral part of a block 34, and aligned on an axial plane of the capstan. Each set of pole tips has a uniform width represented in the drawing by the arrows 36, and adjacent pairs of pole tips are spaced axially apart for a uniform dimension represented in the drawing by the arrows 37. It is important to ensure that the pressure bearing area over which the tape is compressed between each pair of pole tips 33 and the confronting land portions 32 of the capstan, is at all times a constant area, the value of which is uniform for every pair of pole tips 33. If the pressure bearing area varies as the land portions 32 scan the pole tips, or if the pressure bearing area for one pair of pole tips is different than the pressure bearing area of another pair, the signal magnetically recorded on or reproduced from the tape will be correspondingly varied in strength, and the recording and reproducing operations will be unsatisfactory. To obviate such a condition, the pitch of the groove 31 is selected at a value that is an aliquot part of the width 36 of the pole tips. As is shown in FIGURE 2, the pitch of the groove is represented by the arrows 38 as being the dimension between similar portions of adjacent turns of the groove 31, e.g., the dimension between the left-hand sides of an adjacent pair of turns, or the center-to-center dimension between adjacent turns. Also as herein used, the term "aliquot part" means "that divisor of a given dividend that results in a quotient that is an integer." For example as shown in FIGURE 2, the pitch dimension 38 is one-half the pole tip width 36, so that in a relationship in which the given pole tip width 36 is the dividend, and the pitch 38 is the divisor, the quotient is the integer "2." As herein used, the term "aliquot part" includes any of the above described relationships in which the quotient is the integer "1" or any integer of greater value, but excludes relationships in which the quotient is less than unity or is a fraction. In other words, relationships in which the pitch 38 is equal to or less than the pole tip width 36 are included in the term "aliquot," but relationships in which the pitch 38 is greater than the pole tip width 36 are excluded.

It will be seen that when the above described aliquot relationship is satisfied, then the pressure bearing area between the lands 32 of the capstan and the confronting surface of the pole tips 33 is always constant no matter what the position of the lands with respect to the pole tips, so long as the various pairs of pole tips 33 have a uniform width 36. This is true even if the spacing 37 between the pole tips is different from the width 36, and even if the spacings 37 between the various pole tips are not uniform. Consequently, the signals recorded on the tape and reproduced therefrom by various pairs of pole tips are constantly of the same strength for each pair of pole tips, and is also of uniform strength from pair to pair of the pole tips 36.

Typical dimensions as used in actual practice are: pole tip width, 0.050 inch; groove pitch, 0.050 inch; groove width, 0.006 inch; and groove depth, 0.004 inch.

Figure 4:
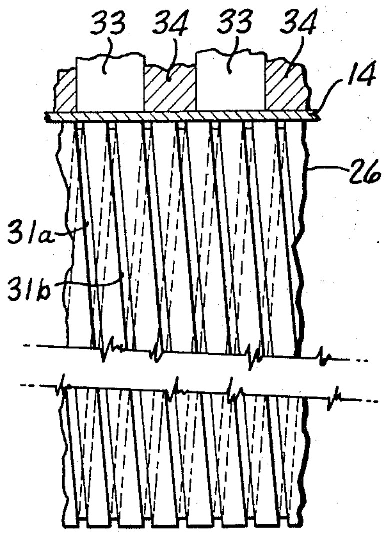
FIGURE 4 is a section similar to that of FIGURE 2, illustrating a variational form of the invention.

It will be apparent that the invention as above described may be applied with the use of any number of helical grooves, so long as the actual center-to-center pitch interval between any adjacent pair of turns of said grooves is an aliquot part of the pole tip width, as illustrated for grooves 31*a* and 31*b* in FIGURE 4.

Thus there has been described a structure in accordance with the invention including a capstan with a helical groove formed in the tape-engaging surface thereof for deflating the air bearing that would otherwise occur at high speeds. The helical shape of the groove provides even wear of the tape and of the transducing head engaging the tape, during slow speed recording and reproducing operation. In addition, the pitch of the helical groove is established as an aliquot part of the transverse width dimension of the magnetic pole tips of the head engaging the tape. Thus during slow speed recording and reproducing operation, the pressure bearing area between the pole tips and the tape remains constant, as the groove scans the pole tip, and the recorded and reproduced signal strength likewise remains constant.

What is claimed is:

1. In a magnetic tape transport and transducing apparatus including a rotating member engaging one side of said tape and a transducing means mounted for movement between retracted and transducing positions on the other side of said tape opposite said rotating member, said transducing means having at least one pair of magnetic pole tips confronting said tape in said transducing position thereof, said pole tips being of predetermined width in an axial direction of said rotating member, the improvement comprising:

said rotating member being provided with at least one helical groove coaxial therewith and formed in the tape-engaging surface thereof, for deflating air bearing between said tape and rotating member;

the pitch of said groove being an aliquot part of said predetermined pole tip width.

2. In a magnetic tape transport and transducing apparatus including a capstan provided with a resilient cylindrical peripheral portion engaging one side of said tape and a transducing means mounted for movement between retracted and transducing positions on the other side of said tape opposite said capstan, said transducing means having at least one pair of magnetic pole tips confronting said tape in said transducing position thereof, said pole tips being of predetermined width in an axial direction of said capstan, the improvement comprising:

said resilient cylindrical peripheral portion of said capstan being provided with a single helical groove coaxial therewith and formed in the tape-engaging surface thereof, for deflating air bearing between said tape and capstan;

the pitch of said groove being an aliquot part of said predetermined pole tip width.

3. In a magnetic tape transport and transducing apparatus including a capstan for moving said tape, said capstan being provided with a resilient cylindrical peripheral portion engaging one side of said tape, transducing means mounted for movement between retracted and transducing positions on the other side of said tape opposite said capstan, said transducing means having at least one pair of magnetic pole tips confronting said tape in said transducing position thereof, said pole tips being of predetermined width in an axial direction of said capstan, means for feeding said tape to and from said capstan at a predetermnied tension and at a rate equal to and dependent on the speed of movement imparted to said tape by said capstan, and means for operating said capstan in both directions at a predetermined normal metering rate with said transducing means in said transducing position thereof, and at a predetermined fast metering rate with said transducing means in said retracted position thereof, the improvement comprising:

said resilient cylindrical peripheral portion of said capstan being provided with a single helical groove coaxial therewith and formed in the tape-engaging surface thereof, for deflating air bearing between said tape and capstan at said predetermined fast metering rate thereof;

the pitch of said groove being an aliquot part of said predetermined pole tip width for ensuring uniform transducing of said tape by said transducing means at said predetermined normal metering rate of said capstan.

4. In a magnetic tape transducing apparatus including a rotating member engaging one side of said tape and a transducing means mounted for movement between retracted and transducing positions on the other side of said tape opposite said rotating member, said transducing means having at least one pair of magnetic pole tips confronting said tape in said transducing position thereof, said pole tips being of predetermined width in an axial direction of said rotating member, the improvement comprising:

said rotating member being provided with a plurality of helical grooves coaxial therewith and formed in the tape-engaging surface thereof, for deflating air bearing between said tape and rotating member;

the pitch interval of adjacent turns of said grooves being an aliquot part of said predetermined pole tip width.

5. In a magnetic tape transport and transducing apparatus including a capstan for moving said tape, said capstan being provided with a resilient cylindrical peripheral portion engaging one side of said tape, transducing means mounted for movement between retracted and transducing positions on the other side of said tape opposite said capstan, said transducing means having at least one pair of magnetic pole tips confronting said tape in said transducing position thereof, said pole tips being of predetermined width in an axial direction of said capstan, means for feeding said tape to and from said capstan at a predetermined tension and at a rate equal to and dependent on the speed of movement imparted to said tape by said capstan, and means for operating said capstan in both directions at a predetermined normal metering rate with said transducing means in said transducing position thereof, and at a predetermined fast metering rate with said transducing means in said retracted position thereof, the improvement comprising:

said resilient cylindrical peripheral portion of said capstan being provided with a plurality of helical grooves coaxial therewith and formed in the tape-engaging surface thereof, for deflating air bearing between said tape and capstan at said predetermined fast metering rate thereof;

the pitch interval of adjacent turns of said grooves being an aliquot part of said predetermined pole tip width for ensuring uniform transducing of said tape by said transducing means at said predetermined normal metering rate of said capstan.

References Cited by the Examiner

UNITED STATES PATENTS

| | | | |
|---|---|---|---|
| 2,717,037 | 9/1955 | Goodwillie | 226—190 X |
| 2,952,201 | 9/1960 | Gibson | 226—190 X |
| 3,056,164 | 10/1962 | Reichel et al. | 226—193 X |
| 3,082,925 | 3/1963 | MacNeill et al. | 226—95 |
| 3,122,295 | 2/1964 | Davison et al. | 226—95 X |
| 3,143,267 | 8/1964 | Maxey | 226—95 |

M. HENSON WOOD, Jr., *Primary Examiner.*

A. N. KNOWLES, *Assistant Examiner.*